UNITED STATES PATENT OFFICE.

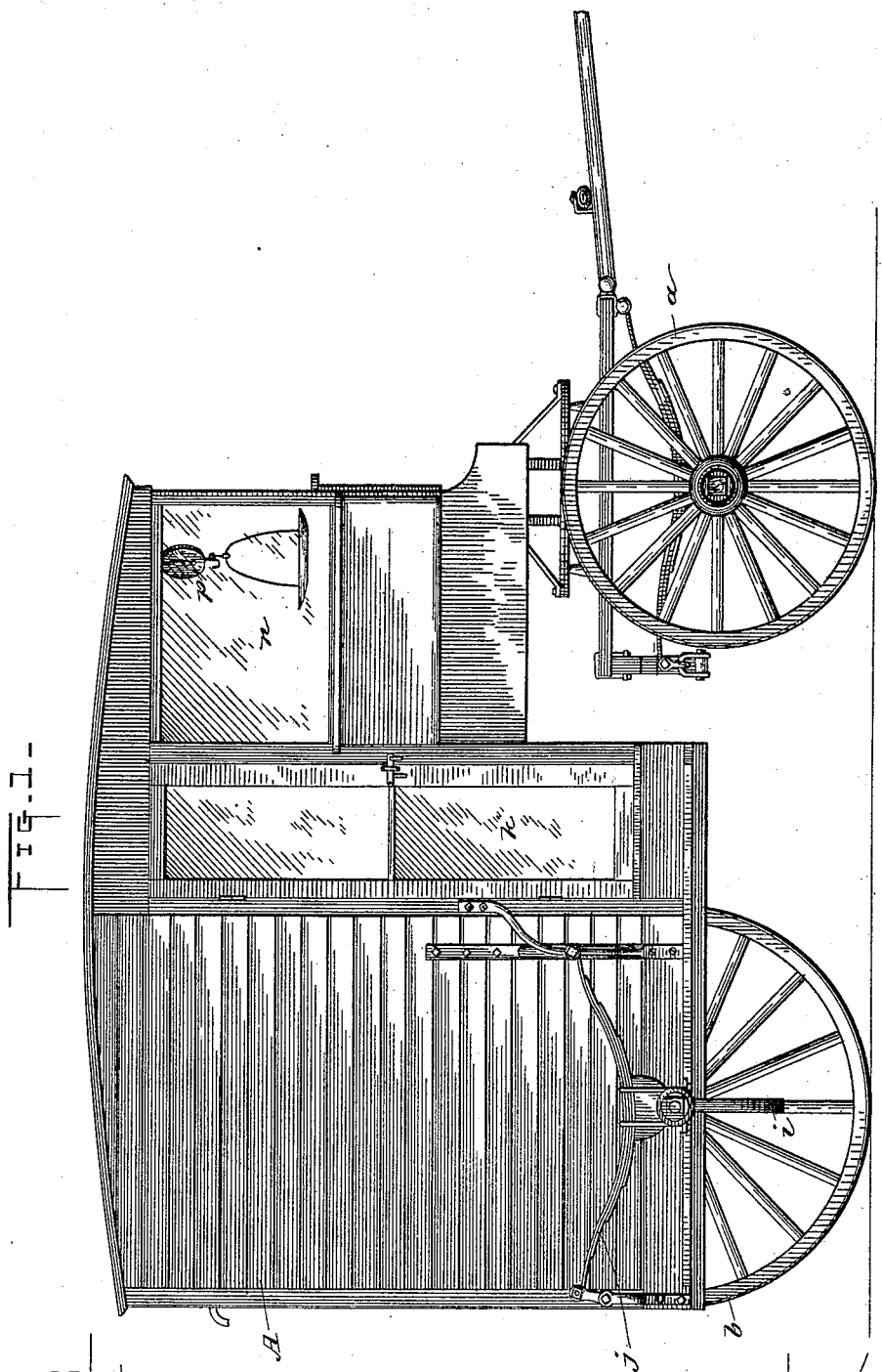

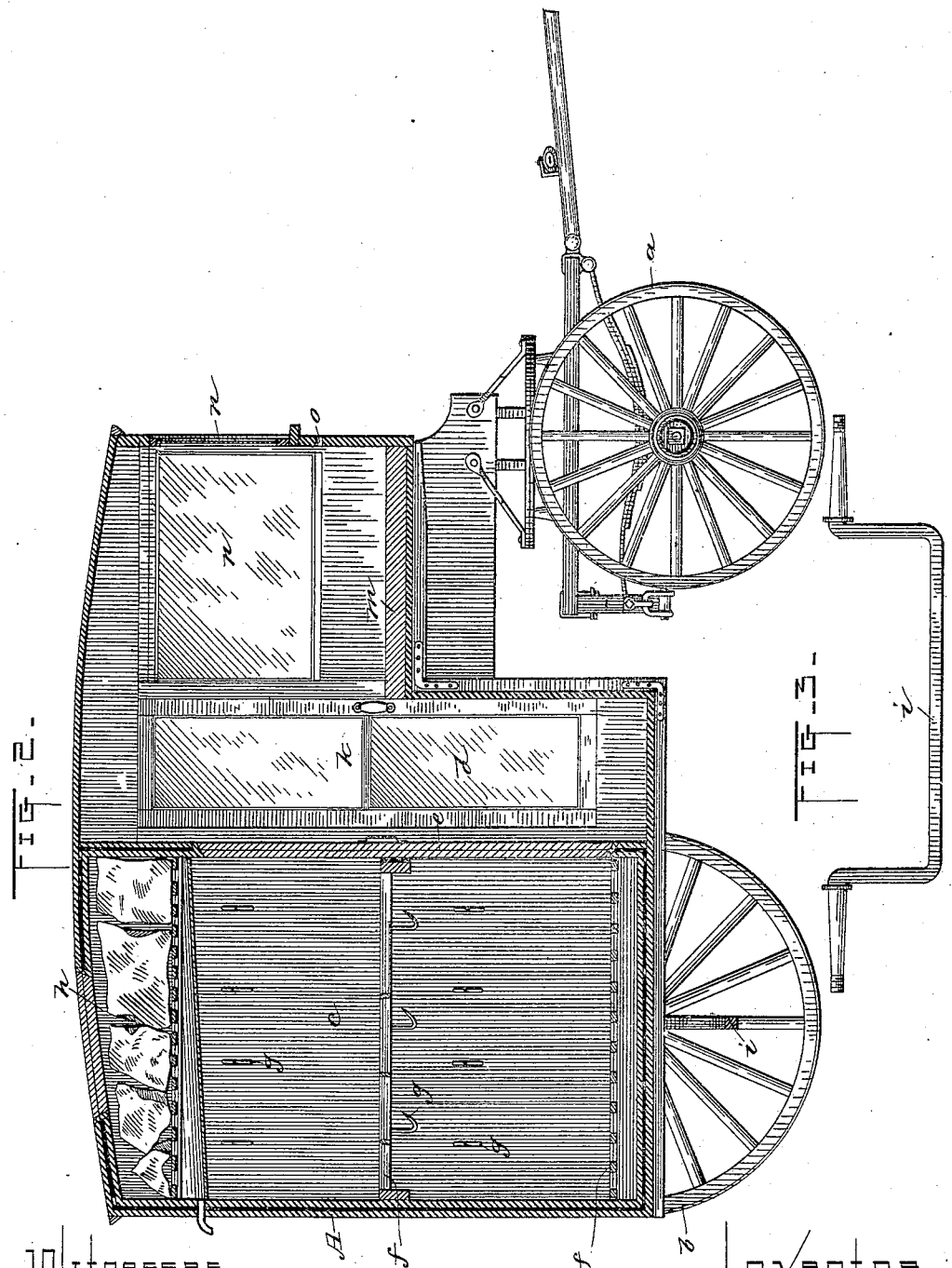

GEORGE R. KENT, OF BURLINGTON, WISCONSIN, ASSIGNOR OF ONE-HALF TO A. J. HANNAS, OF SAME PLACE.

BUTCHER'S WAGON.

SPECIFICATION forming part of Letters Patent No. 397,725, dated February 12, 1889.

Application filed November 17, 1888. Serial No. 291,127. (No model.)

*To all whom it may concern:*

Be it known that I, GEORGE R. KENT, a citizen of the United States, residing at Burlington, in the county of Racine and State of Wisconsin, have invented certain new and useful Improvements in Butchers' Wagons or Traveling Meat-Markets, of which the following is a specification, reference being had therein to the accompanying drawings.

The object of my invention is to provide a convenient butcher's wagon or traveling meat-market of such construction that it will contain a spacious receptacle for meats, &c., to which the driver can have ready access without alighting from the wagon, while the compartment in which the driver stands can be entirely closed, so as to exclude flies in warm weather or protect the driver from cold in severely cold weather. To this end I have constructed the improved wagon illustrated in the accompanying drawings, in which—

Figure 1 is a side view of my wagon with one of the rear wheels removed to show the manner in which the wagon-body is hung. Fig. 2 is a longitudinal section of the wagon-body with the running-gear in elevation in front, and Fig. 3 is a detail view of the bent rear axle.

A denotes the wagon-body, the front part of which is preferably sufficiently elevated to permit the front wheels, $a$, to run under it, thereby admitting of sharp turns in crowded streets and other places, while the bottoms of the central and rear portions of said body are depressed below the centers of the rear wheels, $b$, to afford a roomy meat-compartment, $c$, and a central space, $d$, which latter is of sufficient height to permit the driver or attendant to stand upright. The meat-compartment is closed in front by a door, $e$, and may be provided with one or more shelves, $f$, and with suspending-hooks $g$. To cool the meat-compartment in warm weather, I provide an elevated ice-chamber, $h$, above the same, and below said ice-chamber is an inclined drip-pan having a discharge-spout, the latter being preferably at the rear of the wagon, as shown in Fig. 2.

To permit of the depression of the rear portion of the wagon partly between the rear wheels, the rear axle, $i$, is downwardly bent or U-shaped, as shown in Fig. 3, and the rear part of the wagon-body is suspended on springs $j$, which are on the sides above the bottom thereof. The wagon is provided with side doors, $k$, and the raised floor of the front part of the wagon sustains a chopping-block, $m$, which is of convenient height for the attendant.

The front of the wagon is preferably inclosed by side and front windows, $n$, and below the front windows there may be a suitable aperture or apertures, $o$, for the passage of the reins from the horse to the driver.

Weighing-scales $p$ are suspended in front above the chopping-block, and suitable receptacles or racks for knives, cleavers, &c., may also be provided in front, if desired.

From the foregoing it will be apparent that I provide a convenient butcher's wagon or traveling meat-market, the meat-compartment of which may be kept cool in summer and from which the attendant need not alight in serving customers, while he can have access to the meats without going to the rear of the wagon, where he cannot properly look after the horse should the latter be unreliable when standing alone.

As the compartment in which the attendant remains is entirely closed by the doors and windows and is shut off from the meat-compartment, it may, if desired, be heated by an oil or vapor stove in very cold weather to keep the driver comfortable.

It is obvious that my improved wagon is adapted for the use of fishmongers and others as well as butchers.

Having thus described my invention, I claim and desire to secure by Letters Patent—

1. A butcher's wagon the body of which has central and rear parts, the bottoms of which are depressed below the centers of the rear wheels, and a front part having side and front windows, and the floor or bottom of which is elevated above the tops of the forward wheels and is of suitable height to sustain a chopping-block, said rear part having a meat-compartment closed at its sides and rear end, but provided with a door in front, and said central part (which is for the driver or attendant) being closed by side doors, substantially as set forth.

2. A butcher's wagon having a bent rear axle, $i$, a wagon-body, A, the central and rear parts of which are depressed below the center of the rear wheels, springs $j$ at the sides of the rear part of said body, on which the latter is suspended, a rear meat-compartment, $c$, having a door, $f$, at its front, an ice-chamber, $h$, above said meat-compartment, and a driver's space, $d$, with a depressed floor and with side doors and a closed front, the floor of which is raised above the tops of the forward wheels, and which thus affords a suitable support for the chopping-block $m$, substantially as set forth.

In testimony whereof I affix my signature in presence of two witnesses.

GEORGE R. KENT.

Witnesses:
A. F. RANSOM,
F. REUSCHLEIN.